United States Patent [19]

Allgulin

[11] Patent Number: 4,566,975
[45] Date of Patent: Jan. 28, 1986

[54] METHOD FOR PURIFYING AQUEOUS SOLUTIONS

[75] Inventor: Torkel Allgulin, Helsingborg, Sweden

[73] Assignee: Boliden Aktiebolag, Stockholm, Sweden

[21] Appl. No.: 649,712

[22] Filed: Sep. 12, 1984

[30] Foreign Application Priority Data

Sep. 12, 1983 [SE] Sweden ............................ 8304858

[51] Int. Cl.⁴ ............................................. C02F 1/52
[52] U.S. Cl. .................................... 210/711; 210/713; 210/724; 210/726; 210/906; 210/911; 210/912; 210/914; 423/601
[58] Field of Search .................. 75/109; 210/702, 710, 210/713, 737, 724–728, 906, 911, 912, 914, 711; 423/101, 104, 305, 601, 602

[56] References Cited

U.S. PATENT DOCUMENTS

| | | | |
|---|---|---|---|
| 3,617,569 | 11/1971 | Daniels et al. | 210/727 |
| 3,725,265 | 4/1973 | Legal, Jr. et al. | 210/710 |
| 4,138,231 | 2/1979 | Hedenas et al. | 55/71 |
| 4,201,667 | 5/1980 | Liao | 210/721 |
| 4,366,128 | 12/1982 | Weir et al. | 423/602 |

FOREIGN PATENT DOCUMENTS

| | | | |
|---|---|---|---|
| 2040272 | 3/1971 | Fed. Rep. of Germany . | |
| 50-75562 | 6/1975 | Japan | 210/911 |
| 51-26759 | 3/1976 | Japan | 210/911 |
| 51-10028 | 4/1976 | Japan | 210/914 |
| 1502775 | 3/1978 | United Kingdom | 210/726 |
| 389691 | 9/1977 | U.S.S.R. | 210/911 |
| 859321 | 8/1981 | U.S.S.R. | 210/724 |

OTHER PUBLICATIONS

Gulledge et al., "Removal of Arsenic from Water by Adsorption on Aluminum and Ferric Hydroxides," *JAWWA*, Aug. 1973, pp. 548–552.

*Primary Examiner*—Peter Hruskoci
*Attorney, Agent, or Firm*—Burns, Doane, Swecker & Mathis

[57] ABSTRACT

The invention relates to a method for purifying aqueous solutions containing at least one impurity element from the group consisting of arsenic, phosphorus, mercury and other heavy metals and solid matter by precipitation in at least two stages with the aid of precipitation reagents possessing ions capable of forming not-readily dissolved hydroxide precipitate. In accordance with the invention the main part of the precipitation reagent is introduced to the stage or stages following the first stage. The impurity element-containing precipitate formed in the aqueous solution subsequent to adding the reagent is separated therefrom substantially completely, and is returned so as to be present in the first precipitation stage, while that part of the solution which has been freed from precipitate in a later stage is withdrawn from the system. Substantially all the impurity element amount present in the ingoing aqueous solution are separated therefrom in the form of a sludge prior to the second precipitation stage.

The amount of reagent introduced to the precipitation stages is suitably adapted so that the ratio of equivalence Me to a mole of impurity elements, expressed as X is at least 2, preferably 10–15, in the last stage, and at least 0.8, preferably 1–3, in the first stage.

12 Claims, 1 Drawing Figure

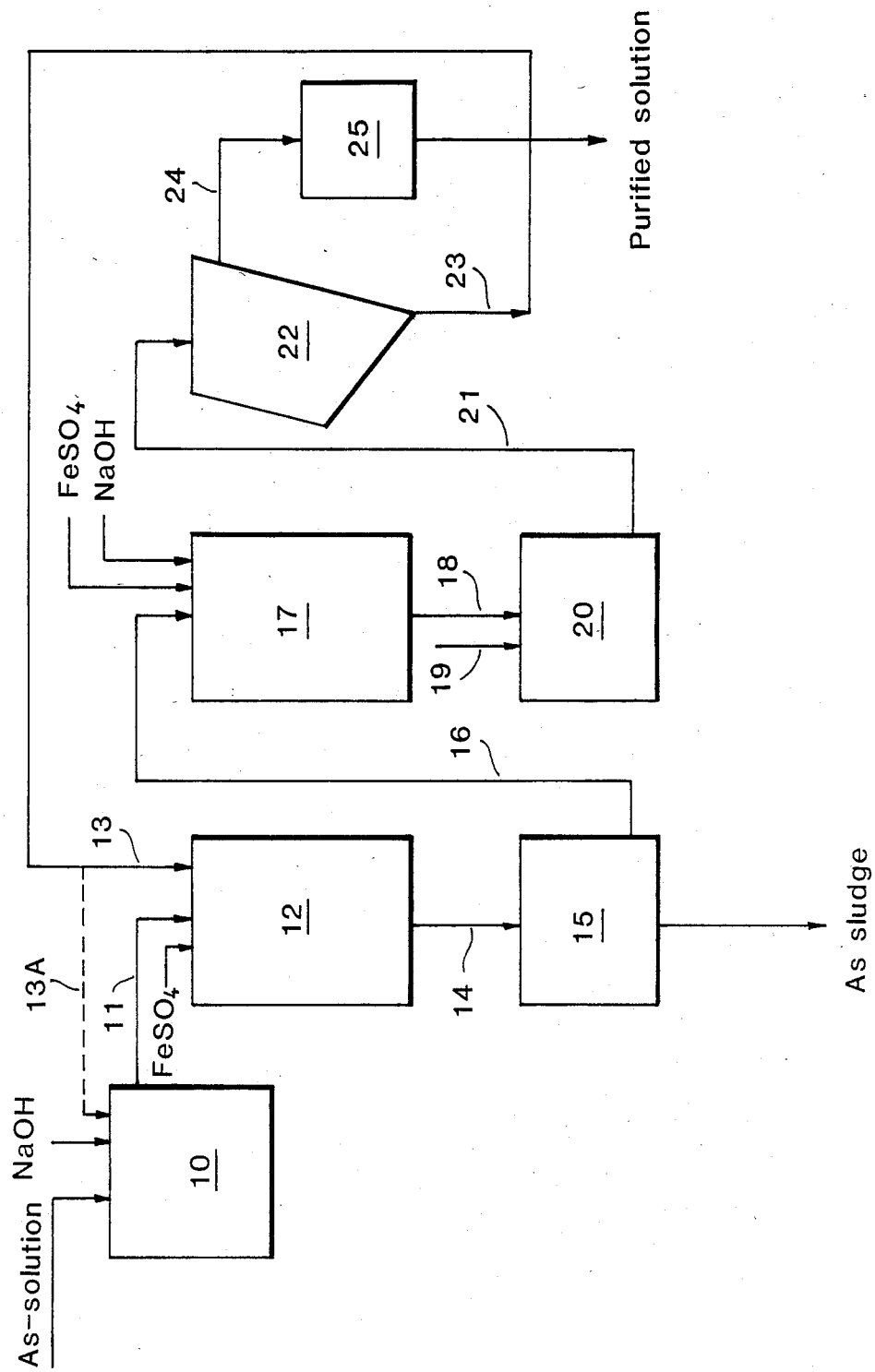

METHOD FOR PURIFYING AQUEOUS SOLUTIONS

The present invention relates to a method for purifying aqueous solutions containing at least one impurity element from the group consisting of arsenic, phosphorus, mercury and other heavy metals and solid matter. More specifically, the invention relates to a method for removing impurities by precipitation in at least two stages in an acid-free environment with the aid of known precipitation reagents possessing ions capable of forming hydroxide precipitates.

It is known that arsenic can be isolated from aqueous solutions by precipitation with the aid of the system $Me^{n+}/Me(OH)_n$, i.e. a combination of free ions and hydroxide of the element Me. A few of those elements Me of particular interest in the present case will be given here, these elements being Mn, Zn, Cd, Cr, Fe, Al and Ca. Of these elements, Fe, Al and Ca are considered the most suitable for use in the present context, since they do not create environmental problems of an unduly serious nature.

When separating the impurities by precipitation in accordance with known methods, however, the precipitation reagent must be used in a quantity which ensures a substantial stoichiometric excess of precipitation-ions. The reason herefor is thought to be because a percentage of the precipitation-ions introduced form complexes in the solution and thereby become inactive. For example, many of the ions in question, e.g. Al and Fe, are liable to build complexes in aqueous solutions, in the presence of sulphur dioxide, to form sulphur/oxy-compounds.

Even when adding the precipitation reagent to the solution in such excess quantities, it is still difficult to obtain the low residual arsenic contents of the purified solution now required by many countries before allowing the solutions to be dumped, for environmental reasons. The lowest residual contents obtainable in practice have hitherto lain within the range of 0.2–0.3 g/l. In an effort to reach lower residual arsenic contents, attempts have been made to precipitate the arsenic in two stages, although without any appreciable success, despite adding a substantial total excess of precipitation reagent to the solution.

A single-stage or multi-stage process for the precipitation of arsenic and phosphorous in combination with oxidation is proposed in U.S. Pat. No. 4,201,667. In this process, chlorine, in some suitable oxidizing form, is added to the system, either before or after adding Ca(OH)$_2$ thereto. It is also possible to precipitate out by oxidation, in the presence of calcium ions, arsenic and phosphorous compounds having a low oxidation number. It is not always desirable, however, or even advisable, to charge oxidizing substances to the system, since these substances are often just as harmful to the environment as the impurities originally present.

It is further known in the field of water conservation to remove phosphorus by adding divalent and trivalent metal-ions to the water, the phosphorus being bound to flocs formed by the metal-ions and the flocs settling to form a mud or sludge, which is subsequently removed. Although the limit of 0.3 mg/l set by the National Swedish Nature Conservancy Board can be achieved, it has at times only been accomplished with great difficulty.

Consequently, there is proposed in U.S. Pat. No. 3,617,569 a two-stage process in which the first stage is quite conventional, while precipitation in the second stage is effected with soluble lanthanide metal salts. The use of such extreme and rare reagents, however, would likely be reserved for solely extremely special and demanding cases, inter alia because of the costs involved.

In U.S. Pat. No. 3,725,265 there is described a two-stage process in which CaO is charged to the first stage at a pH of about 5, in order to precipitate out phosphorous, whereafter the pH is raised to 6.5–8.5, before carrying out the second precipitation stage. This process is less expensive than the process of U.S. Pat. No. 3,617,569. A residual content of 30–80 ppm $P_2O_5$ can be achieved at pH 7.0. Lower residual contents may be obtained when raising the pH as high as 8.5.

According to DE-A-2 040 272, phosphorous is precipitated from the aqueous solution with the aid of lime in a single stage, and part of the slime formed during this precipitation process is returned to the process, to be mixed with the precipitation reagent as it is charged to the aqueous solution.

None of the known processes for purifying aqueous solutions of their arsenic and phosphorous contents can be said to be attractive generally, since these processes are either technically complicated or doubtful from an economic aspect. Moreover, despite the high costs and intricate process steps, none of the known processes provides a satisfactory result with respect to present day stringent environmental requirements.

Consequently, there is a need for an improved method for separating arsenic and phosphorus from aqueous solutions, by means of which the stringent requirements concerning the release of arsenic and phosphorus to waterways, lakes etc can be fulfilled more readily at a cost which can be afforded by industry and the local authorities concerned.

During the exploratory work carried out in the attempt to develop improved precipitation technology with respect to the isolation of arsenic and/or phosphorous present in an aqueous solution, it was surprisingly discovered with the advent of the invention that a very large percentage of mercury and other heavy metals present in the aqueous solution could also be precipitated out at the same time as the arsenic and phosphorous. Also any solid matter, organic or inorganic, present was effectively removed with the precipitate. It was even found that the improved technology, aimed towards the precipitation of arsenic in aqueous solutions could also be applied advantageously to precipitate effectively heavy metals, provided that there is chosen a precipitation reagent which causes not-readily dissolved hydroxides to form in the solution. It has been found that the best reagents for use in this connection are iron and aluminium ions, although other metal ions, such as Mn, Zn, Cd and Cr, can also be used. In addition hereto, it is also possible in certain instances to use magnesium and/or calcium compounds. Although the hydroxide solubility of the metals in group 2a of the periodic system is high, they can still be used as a precipitation reagent in concentrated solutions containing large quantities of impurities. The group 2a metals are highly attractive sources of hydroxide, and hence they can be used in spite of their aforementioned drawbacks.

It has also been found possible to precipitate out unoxidized impurities, thereby obviating the need to add an oxidizing agent prior to precipitation (c.f. the aforementioned U.S. Pat. No. 4,201,667).

The above mentioned surprising results when purifying water solutions are obtained when applying the method according to the invention, which is characterized by the procedural steps set forth in the accompanying claims.

Thus, in accordance with the invention the impurities in question are precipitated in two or more stages, in which a large percentage of the precipitation reagent is supplied in the second stage and also to any subsequent stage. In this way, there is formed in the aqueous solution a hydroxide precipitate which contains the impurities and which can be substantially completely separated from the solution. No harm is caused if a minor part of the aqueous solution accompanies the precipitate when it is separated from the solution, provided that substantially all of the precipitate is removed from the remainder of the solution.

The aqueous solution from which the precipitate has been removed can be safely dumped, while the precipitate itself, together with any accompanying solution, can be returned to the water. The procedure adopted when returning the precipitate can take many forms, the important thing being that the precipitate is present in the first precipitation stage. For example, the precipitate can be returned to the impure aqueous solution introduced to the first precipitation stage, optionally subsequent to alkalizing the precipitate if necessary, or alternatively, if found more practical, the precipitate can be returned directly to the first precipitation stage. In this regard, the precipitate may first be dissolved in water before being returned to the aqueous solution before or in the first precipitation stage. The precipitate present in the aqueous solution subsequent to the first precipitation stage is removed from said stage in the form of a mud or sludge, prior to introducing the aqueous solution to the second precipitation stage.

Normally, the quantity of precipitation agent supplied to the various stages is adapted so that the ratio of the amount of precipitation ions present in the solution to the amount of impurity element ions contained therein is much lower than in subsequent stages. More specifically, it should be ensured that the quantity of precipitation reagent supplied to the first stage is such that the ratio of equivalents of precipitation metal-ions to moles of impurity elements is at least 0.8, preferably between 1 and 3, said ratio being expressed hereinafter as X. In the last stage the ratio X is suitably at least 2, preferably between 10 and 15. When the precipitation process is effected in more than two stages, the precipitation reagent introduced can be divided between the second stage and any subsequent stage or stages, although it is preferably introduced to the last stage, so as to obtain the aforementioned ratio X in the final stage of the process.

As indicated above, during the precipitation process the solution should be alkaline or should at least have a pH at which hydroxide precipitations are formed. Consequently, it may be necessary to add alkali, suitably $Ca(OH)_2$, $NaOH$ or $NH_4OH$, prior to the first precipitation stage. In this respect, it has been found advantageous to maintain a pH in the solution of at least about 9 when precipitating $Me(OH)_2$-impurity element in the first stage. In the second stage, or any subsequent stage, a pH of between 8 and 9 is sufficient to achieve acceptable precipitation. The pH can be lower when using other hydroxide builders, such as $Me^{3+}$-ions.

Sludge present in the solution subsequent to the first stage is suitably separated from said solution mechanically, preferably by centrifugation, there being obtained in this way an extremely thick sludge. It is not absolutely necessary for all of the sludge to be removed at this stage, since any remaining sludge will be isolated and removed after the final stage, and returned to the process.

Precipitation is best carried out at solution temperatures beneath about 50° C., and preferably beneath 30° C.

The invention will now be described in more detail with reference to the accompanying drawing, the single FIGURE of which is a flow sheet illustrating a preferred embodiment of the invention, and also with reference to a number of practical working examples.

As illustrated in the FIGURE, a contaminated solution is charged to a mixing tank 10, to which alkali and optionally also return sludge are also charged. Alkali is charged to the tank 10, to adjust the pH of the solution to about 9.0. The thus alkalised solution is pumped through a pipe 11 to a first precipitation tank 12. $FeSO_4$ is added to the solution in the tank 12, to which sludge containing impurities and iron separated from a subsequent precipitation stage, is also charged through a pipe 13. Iron sulphate is added solely in an amount which provides a total ratio X of at least 1-3. In this way, between 70 and 80% of the impurity content of the solution is precipitated out. Solution and precipitate are removed from the tank 12 through a pipe 14, and passed to a separation plant 15, which suitably comprises a separator. At least a substantial part of the precipitate present is separated from the solution in the separator 15. As previously indicated, it is not necessary to attempt to remove all the precipitate at this stage. The impurity-containing sludge separated from the solution is removed for further processing with respect to its content of impurity and precipitating agent metals.

The solution freed from the major part of its impurity content in the separator 15 is then pumped to a further precipitation tank 17. Alkali, here exemplified as $NaOH$, is charged to the tank 17, together with a precipitation agent, here exemplified as $FeSO_4$. The amount of alkali added to the solution is adapted so that, subsequent to adding $FeSO_4$, the pH of said solution lies within the range of 8.0-9.0, while the amount of sulphate added is adapted so that the ratio X in the solution lies between 10 and 15. In this way, impurity elements can be precipitated-out to a residual content of less than 1 mg/l solution. The majority of the precipitate formed often comprises a relatively voluminous iron-hydroxide with impurity ions such as $AsO_2^-$ adsorbed thereon. Any mercury and other heavy metals present in the solution will thus be precipitated out, together with any arsenic and phosphorous and the iron, to leave extremely low residual contents. When using iron sulphate as the precipitation agent, it has, for example, been found possible to precipitate mercury to residual contents beneath about $10^{-3}$ mg/l, as compared with the relatively high residual contents of from $10^{-1}$–$10^{-3}$ mg/l achievable with hitherto known methods. Upon completion of the precipitation process, the solution and the precipitate present therein is passed through a pipe 18 to a flocculating tank 20, to which a suitable flocculating agent is passed through a supply pipe 19. The thus treated solution is pumped from the flocculating tank 20 through a pipe 21 to a lamella separator 22. The flocculated precipitate is separated from the solution in the lamella separator, and is removed in the form of a sludge from the bottom of the separator 22, as indicated by the line 23, while cleansed solution is removed via an overflow pipe 24, and passed to a cloth filter 25, where the solution is cleansed still further and from which the filtered, purified solution is withdrawn and dumped.

The sludge taken from the bottom of the lamella separator 22 is passed through the pipe 23 and the pipe 13 back to the first precipitation tank 12, or through the pipe 13 A shown in broken lines and back to the mixing tank 10. Alternatively, the sludge can be charged to the ingoing solution and mixed therewith, prior to charging the solution to the mixing tank 10.

Those impurity-element containing aqueous solutions which can be advantageously purified by means of the method according to the invention include acid condensate containing arsenic, mercury, selenium, cadmium and any other heavy metals and any solid matter formed when cooling roaster gases in accordance with the roaster-gas cleansing method described in U.S. Pat. No. 4,138,231 assigned to Boliden Aktiebolag. The invention can advantageously be generally employed for the purification of process water solutions derived from chemical and metallurgical industries, especially solutions containing arsenic and heavy metals.

The purifying of such acid condensate is described in the following Example 1.

EXAMPLE 1

A crude aqueous condensate derived from a gas-cleaning system for roasting furnaces which condensate contains 0.5–2% $H_2SO_4$
0.5–2 g/l As
about 2 mg/l Hg
$\leq 0.2$ g/l $SO_2$ (after stripping)

was treated according to the preferred embodiment of the invention shown in the flow sheet in the single FIGURE.

The condensate had a pH of 0.5–1.5. The pH was adjusted to about 9 by adding 25% NaOH. Oxidic iron-arsenic sludge was charged to step 1 and $FeSO_4$ was charged to stage 2. The $FeSO_4$ charged to stage 2 was in the form of a non-acid solution having a pH of 8–9. The iron was charged in an amount such that the weight ratio Fe/As in the first stage was about 0.5 and in the second stage about 7. The weight ratio Fe/As=1:1 corresponds to an X-value of about 3. When precipitating in accordance with the method according to the invention it was possible to bring the arsenic-content of the condensate down to about 1.0 mg/l, under optimal conditions, and to bring the mercury contents down to a level between 0.5 and 1.2 μg/l. Only traces of cadmium and other of the heavy metals contained in the ingoing solution could be detected. In Table 1 below there is shown relevant data deriving from various purification tests, in which the contents are given in mg/l.

TABLE 1

| | Stage 1 | | | Fe/As sludge w/w | | Stage 2 | |
|---|---|---|---|---|---|---|---|
| $As_{tot}$ | $Fe_{tot}$ | Fe/As w/w | pH | | pH | Fe/As w/w | $As_{out}$ |
| 2510 | 1220 | 0.49 | 10.0 | 0.92 | 7.2 | 1.47 | 380 |
| 2530 | 1205 | 0.48 | 10.3 | 1.02 | 7.2 | 1.33 | 420 |
| 2590 | 1195 | 0.46 | 10.6 | 1.20 | 8.5 | 1.30 | 23 |
| 3187 | 1980 | 0.62 | 11.8 | 1.37 | 9.0 | 1.04 | 27 |
| 3333 | 2020 | 0.61 | 9.0 | 0.75 | 9.0 | 2.88 | 5.7 |

TABLE 1-continued

| | Stage 1 | | | Fe/As sludge w/w | | Stage 2 | |
|---|---|---|---|---|---|---|---|
| $As_{tot}$ | $Fe_{tot}$ | Fe/As w/w | pH | | pH | Fe/As w/w | $As_{out}$ |
| 2229 | 1985 | 0.89 | 9.0 | 1.80 | 9.0 | 7.51 | 1.0 |

As will be seen from Table 1 above, precipitation is seriously impaired when the pH of the second stage is beneath 8. It will also be seen that an improved precipitation result is obtained when the ratio of Fe/As is increased in stage 2.

EXAMPLE 2

An acid aqueous solution containing arsenic, phosphorous and heavy metals in accordance with the following (given in mg/l)

As: 600
Cd: 4
Cu: 3
Pb: 40
Zn: 225
Hg: 29
Se: 1 was treated in the same manner as the condensate in Example 1, wherewith the iron addition was adjusted with respect to the total metal content. Subsequent to filtering off the precipitate, it was found that the cleaned solution had the following impurity content (in mg/l):

As: <1
Cd: <0.01
Cu: <0.01
Pb: 0.1
Zu: 0.1
Hg: <0.001
Se: 0.2

I claim:

1. A method for purifying an aqueous solution including at least one of arsenic and phosphorous and containing an impurity selected from the group consisting of mercury, heavy metals, solid matter and mixtures thereof which impurity is capable of being precipitated in a plurality of precipitating stages comprising:
(a) supplying the aqueous solution and precipitating agent comprised of metal ions capable of forming a substantially insoluble hydroxide precipitate to a first precipitating stage wherein the aqueous solution and precipitating agent are mixed at a pH of at least 9 and a precipitate is formed;
(b) separating at least a portion of the precipitate formed in the first precipitating stage containing a portion of the arsenic and/or phosphorus and impurity from the aqueous solution and removing said portion from the aqueous solution;
(c) transferring the aqueous solution to a last precipitating stage;
(d) adding precipitating agent comprised of metal ions capable of forming a substantially insoluble hydroxide precipitate to the aqueous solution in the last precipitating stage at a pH between about 8 and 9 whereby a precipitate is formed;
(e) separating the precipitate formed in the last precipitating stage containing a further portion of the arsenic and/or phosphorus impurity from the aqueous solution wherein substantially purified aqueous solution is obtained;

(f) recycling the precipitate from step (e) to step (a) such that the amount of metal ions in the precipitate is greater than the amount of metal ions supplied by the precipitating agent of step (a) wherein the amount of precipitating agent added to the last precipitating stage is selected such that the ratio of equivalents of precipitating agent to moles of arsenic and/or phosphorus and impurity in the last precipitating stage is at least 2:1 and wherein said ratio in the first precipitating stage is at least 0.8:1 and is less than said ratio in the last precipitating stage.

2. The method of claim 1 wherein the precipitate formed in the last precipitating stage is mixed with the aqueous solution prior to supplying the aqueous solution to the first precipitating stage.

3. The method of claim 2 wherein the precipitate formed in the last precipitating stage is dissolved in water prior to mixing the precipitate with the aqueous solution.

4. The method of claim 1 wherein the precipitate formed in the last precipitating stage is recycled directly to the first precipitating stage.

5. The method of claim 4 wherein the aqueous solution is maintained at a temperature beneath about 50° C.

6. The method of claim 5 wherein the aqueous solution is an industrial waste solution containing arsenic and heavy metals.

7. The method of claim 1 wherein the amount of precipitating agent is selected so that the ratio of equivalents of precipitating agent to moles of impurity is in the range of from 10 to 15 in the last precipitating stage and wherein said ratio is in the range of from 1 to 3 in the first precipitating stage.

8. The method of claim 1 wherein the precipitate formed in the last precipitating stage is dissolved in water prior to mixing the precipitate with the aqueous solution.

9. The method of claim 1 wherein the aqueous solution is maintained at a temperature beneath about 50° C.

10. The method of claim 1 wherein the aqueous solution is maintained at a temperature beneath about 30° C.

11. The method of claim 1 wherein the aqueous solution is an industrial waste solution containing arsenic and heavy metals.

12. The method of claim 1 wherein the aqueous solution is subjected to more than two precipitating stages.

* * * * *